United States Patent
Andrews et al.

(10) Patent No.: US 11,575,544 B2
(45) Date of Patent: Feb. 7, 2023

(54) LOW RESOLUTION OFDM RECEIVERS VIA DEEP LEARNING

(71) Applicant: Board of Regents, The University of Texas System, Austin, TX (US)

(72) Inventors: Jeffrey Andrews, Austin, TX (US); Eren Balevi, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 17/289,555

(22) PCT Filed: Oct. 29, 2019

(86) PCT No.: PCT/US2019/058595
§ 371 (c)(1),
(2) Date: Apr. 28, 2021

(87) PCT Pub. No.: WO2020/092391
PCT Pub. Date: May 7, 2020

(65) Prior Publication Data
US 2022/0014398 A1    Jan. 13, 2022

Related U.S. Application Data

(60) Provisional application No. 62/752,187, filed on Oct. 29, 2018.

(51) Int. Cl.
*H04L 25/02* (2006.01)
*G06N 3/08* (2006.01)
(Continued)

(52) U.S. Cl.
CPC ........... *H04L 25/0254* (2013.01); *G06N 3/08* (2013.01); *H04B 1/0003* (2013.01); *H04B 1/40* (2013.01); *H04L 5/0007* (2013.01)

(58) Field of Classification Search
CPC ...... G06N 3/08; G06N 20/00; H04L 25/0254; H04L 5/0007; H04B 1/0003; H04B 1/04
(Continued)

(56) References Cited

U.S. PATENT DOCUMENTS 7,295,645 B1   11/2007  El-Ghoroury et al.
10,833,785 B1 * 11/2020 O'Shea ............... H04L 27/0008
(Continued)

OTHER PUBLICATIONS

Balevi et al., entitled "Reliable Low Resolution OFDM Receivers via Deep Learning", Feb. 21, 2019 (Feb. 21, 2019); [Retrieved online on Dec. 28, 2019 (Dec. 28, 2019)], [Retrieved from URL:https://ieeexplore.ieee.org/stamp/stamp.jsp?arnumber=8645190]; entire document, especially, p. 3, col. 1, para 1—p. 5, col. 1, last paragraph, pages.

(Continued)

*Primary Examiner* — Emmanuel Bayard
(74) *Attorney, Agent, or Firm* — Foley & Lardner LLP

(57) ABSTRACT

Various embodiments provide for deep learning-based architectures and design methodologies for an orthogonal frequency division multiplexing (OFDM) receiver under the constraint of one-bit complex quantization. Single bit quantization greatly reduces complexity and power consumption in the receivers, but makes accurate channel estimation and data detection difficult. This is particularly true for OFDM waveforms, which have high peak-to average (signal power) ratio in the time domain and fragile subcarrier orthogonality in the frequency domain. The severe distortion for one-bit quantization typically results in an error floor even at moderately low signal-to-noise-ratio (SNR) such as 5 dB. For channel estimation (using pilots), various embodiments use novel generative supervised deep neural networks (DNNs) that can be trained with a reasonable number of pilots. After channel estimation, a neural network-based
(Continued)

receiver specifically, an autoencoder jointly learns a precoder and decoder for data symbol detection.

20 Claims, 11 Drawing Sheets

(51) Int. Cl.
  *H04B 1/00* (2006.01)
  *H04B 1/40* (2015.01)
  *H04L 5/00* (2006.01)
(58) Field of Classification Search
  USPC .......................................................... 375/262
  See application file for complete search history.

(56) References Cited

U.S. PATENT DOCUMENTS

| | | | | |
|---|---|---|---|---|
| 11,334,807 | B1* | 5/2022 | O'Shea | ................ G06N 20/00 |
| 2018/0367192 | A1 | 12/2018 | O'Shea et al. | |
| 2021/0211164 | A1* | 7/2021 | O'Shea | ................ G06N 3/0445 |

OTHER PUBLICATIONS

International Search Report and Written Opinion for PCT Appl. No. PCT/US2019/058595 dated Jan. 31, 2020 (18 pages).

O'Shea et al., entitled "An Introduction to Deep Learning for the Physical Layers", Oct. 2, 2017 (Oct. 2, 2017); [Retrieved online on Dec. 28, 2019 (Dec. 28, 2019)], [Retrieved from URL:https://ieeexplore.ieee.org/abstract/document/8054694]; entire document, especially, abstract, p. 1, col. 2, para 2, p. 3, col. 2, para 1, p. 5, col. 1, para 1, p. 12, col. 1, para 1, 18 pages.

Seyman et al., entitled "Channel estimation based on neural network in space time block coded MIMO-OFDM system", Jan. 2013 (Jan. 2013); [Retrieved online on Dec. 28, 2019 (Dec. 28, 2019)] [Retrieved from URL:https://www.sciencedirect.com/science/article/pi/S1051200412001728]; entire document, 6 pages.

Ye et al., entitled "Power of Deep Learning for Channel Estimation and Signal Detection in OFDM Systems", Sep. 28, 2017 (Sep. 28, 2017); [Retrieved online on Dec. 28, 2019 (Dec. 28, 2019)], [Retrieved from URL:https://ieeexplore.iee.org/document/8052521]; entire document, especially, abstract, FIG. 1, 2, p. 1, col. 1, para 1, p. 1, col. 2, para 5, p. 2, col. 1, para 1, p. 2, col. 2, para 3-4, p. 3, col. 1, para 1-2, p. 4, col. 1, para 2, 4 pages.

\* cited by examiner

LOW RESOLUTION OFDM RECEIVERS VIA DEEP LEARNING

CROSS-REFERENCE TO RELATED APPLICATIONS

This application is a 371 National Stage Application of PCT/US2019/058595, filed Oct. 29, 2019, which claims the benefit of U.S. Provisional Application Ser. No. 62/752,187 filed on Oct. 29, 2018, the contents of which are hereby incorporated by reference in their entirety.

TECHNICAL FIELD

Various embodiments of the present technology generally relate to wireless receivers. More specifically, some embodiments of the present technology relate to receivers that use low resolution quantization to reduce the power consumption, followed by processing deep using deep neural networks to infer the channel and transmitted data symbols.

BACKGROUND

Wireless systems are trending towards ever-higher data rates, which requires ever-more antennas and larger bandwidth; a canonical example being millimeter wave (mm-Wave) systems but in the future will extend to even higher carrier frequencies which will have proportionally more antennas in order to meet the link budget. Wireless systems of interest for this invention include cellular systems under the dominion of 3GPP such as 5G NR and its descendants; wireless LAN and peer to peer protocols, most prominently the IEEE 802.11 class of standards; as well as proprietary systems developed for a range of other applications. For example, virtual and augmented reality, autonomous vehicles, telemedicine, mobile robotics, and other future use cases are expected to demand extraordinarily high data rates with a high level of security, and in many cases low power consumption.

Analog-to-digital converters (ADCs) consume a significant fraction of the power in modern receivers, which is a key bottleneck to large bandwidth and many antenna systems, since the ADC clocking rate typically scales linearly with the bandwidth and the number of antennas. Low resolution quantization—by which usually means less than 6 bits per real and imaginary (I & Q) channel—dramatically reduces the power consumption, e.g., by two or more orders of magnitude relative to 12-bit ADCs, and can in principle perform satisfactorily for a large amount of receive antenna combining (which averages the quantization noise) or at low signal-to-noise-ratios (SNRs). The most aggressive form of low resolution quantization is one-bit quantization, which means one bit for each I & Q channel, and in this case involves only a simple polarity (sign) check, which greatly reduces the ADC circuit area and power consumption.

However, low resolution ADCs fundamentally have poor performance at medium and high SNRs or for the case of few receive antennas. Additionally, OFDM waveforms—which are the core of the physical layer for virtually all modern high-rate wireless systems—are more sensitive to low resolution quantization than single carrier systems. This is because OFDM waveforms have a high peak-to-average ratio, and so low resolution quantization leads to severe inter-carrier interference (ICI) in the frequency domain, where channel estimation and data detection are performed.

SUMMARY

Various embodiments of the present technology generally relate to wireless receivers. More specifically, some embodiments of the present technology relate to low resolution orthogonal frequency-division multiplexing (OFDM) receivers via deep learning. In accordance with various embodiments, "low resolution" in the context of quantization in ADCs generally means between 1 and 6 bits per real and imaginary (I & Q) channel. In some embodiments, the low resolution may be between 1 and 4 bits per real and imaginary (I & Q) channel to achieve maximum benefit.

Some embodiments provide for various novel deep learning-based architectures and design methodologies for an orthogonal frequency division multiplexing (OFDM) receiver under the constraint of low resolution quantization, in particular one bit quantization. Single bit (per I & Q) quantization greatly reduces complexity and power consumption, but makes accurate channel estimation and data detection difficult. This is particularly true for multicarrier waveforms, which have high peak-to-average ratio in the time domain and fragile subcarrier orthogonality in the frequency domain. The severe distortion for one-bit quantization typically results in an error floor even at moderately low signal-to-noise-ratio (SNR) such as 5 dB.

For channel estimation (using pilots), some embodiments use a novel generative supervised deep neural network (DNN) that can be trained with a reasonable number of pilots. After channel estimation, a neural network-based receiver—specifically, an autoencoder—jointly learns a precoder and decoder for data symbol detection. Since low resolution quantization prevents end-to-end training, some embodiments use a two-step sequential training policy for this model. With synthetic data, various embodiments of the deep learning-based channel estimation can outperform least squares (LS) channel estimation for unquantized (full-resolution) OFDM at average SNRs up to 14 dB. For data detection, various embodiments achieve lower bit error rate (BER) in fading than unquantized OFDM at average SNRs up to 10 dB. Various embodiments can use other forms of channel estimation based on unsupervised learning, which can enhance the disclosed invention's performance further.

Embodiments of the present technology also include computer-readable storage media containing sets of instructions to cause one or more processors to perform the methods, variations of the methods, and other operations described herein.

Some embodiments provide for a communication system receiver using low-resolution quantization to reduce power consumption. The communication system receiver can include a low resolution analog to digital convertor that produces a quantized complex valued received signal. The communication system receiver can also include multiple neural networks. For example, in some embodiments, a first neural network can be used to assist in channel estimation. The first neural network can use the quantized complex valued received signal as part of labeled data that trains the first neural network to learn a channel. In some embodiments, a second neural network can be used to enhance quality of a channel estimator which is made by the first neural network. The second neural network may be a special unsupervised untrained generative deep neural network. In some embodiments, a third neural network may be used for data detection to decode transmitted data. In accordance with various embodiments, a detector can be trained offline irrespective of a current channel estimate to be able to detect data symbols that were encoded by a neural network based precoder at a transmitter whose weights depend the current channel estimate.

While multiple embodiments are disclosed, still other embodiments of the present technology will become apparent to those skilled in the art from the following detailed description, which shows and describes illustrative embodiments of the technology. As will be realized, the technology is capable of modifications in various aspects, all without departing from the scope of the present technology. Accordingly, the drawings and detailed description are to be regarded as illustrative in nature and not restrictive.

BRIEF DESCRIPTION OF THE DRAWINGS

Embodiments of the present technology will be described and explained through the use of the accompanying drawings.

Figure 1:
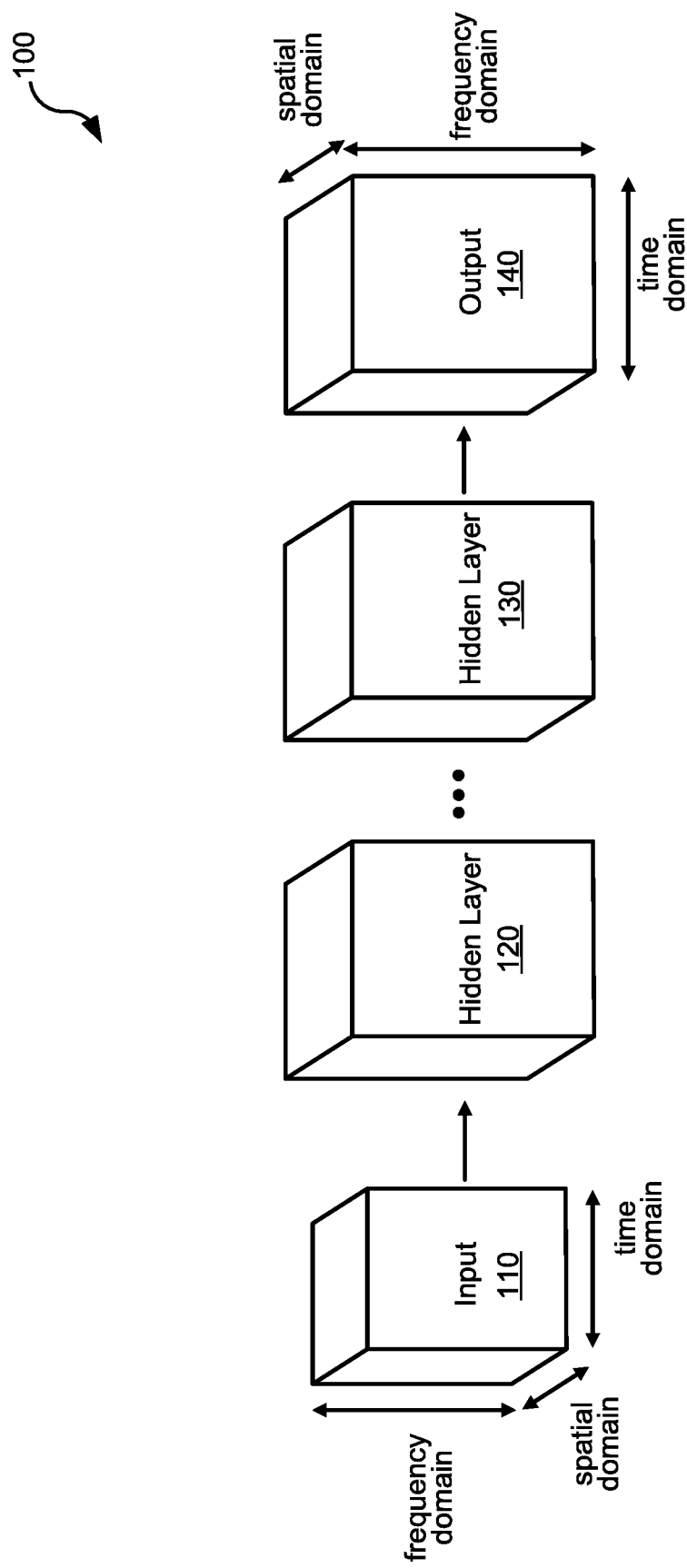
FIG. 1 illustrates an example of a deep neural network model that depicts the input, hidden layers, and output for a 3-dimensional communication signal that may be used in various embodiments of the present technology.

The drawings have not necessarily been drawn to scale. Similarly, some components and/or operations may be separated into different blocks or combined into a single block for the purposes of discussion of some of the embodiments of the present technology. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Various embodiments of the present technology generally relate to wireless receivers. More specifically, some embodiments of the present technology relate to low-bit (e.g., less than six bits, less than 4 bits, one-bit, or the like) orthogonal frequency-division multiplexing (OFDM) receivers via deep learning. Some embodiments provide various systems and techniques for novel deep-learning based transmit and receive methods for OFDM-based communication with low-resolution quantization. OFDM is the core physical layer technology in 4G and 5G cellular, as well as all WiFi standards. Low-resolution quantization saves a lot of power vs. high resolution quantization, at the cost of increased distortion. If the distortion can be managed, this presents an attractive tradeoff given the ever-increasing bandwidths (and thus sampling rates) and antenna array sizes in emerging ultra-high data rate wireless systems. Various embodiments of the present technology manage this distortion with unprecedented fidelity using neural network based techniques for both channel estimation and data detection.

Recognizing that low resolution quantization introduces strong nonlinearities and other intractable features that render traditional OFDM receiver architectures far from optimal, various embodiments of the present technology utilize different neural network architectures for channel estimation and data detection.

However, traditional one-bit ADCs fundamentally have poor performance at medium and high SNRs or for the case of few receive antennas. Additionally, OFDM waveforms—which are the core of the physical layer for virtually all modern high-rate wireless systems—are more sensitive to low-bit (e.g., less than six bits, less than 4 bits, one-bit, or the like) quantization than single carrier systems. This is because OFDM waveforms have a high peak-to-average ratio, and so low-bit (e.g., less than six bits, less than 4 bits, one-bit, or the like) quantization leads to severe inter-carrier interference (ICI) in the frequency domain, where channel estimation and data detection are performed. Yet most prior work has been for single carrier communication.

Recognizing that low-bit (e.g., less than six bits, less than 4 bits, one-bit, or the like) quantization introduces strong nonlinearities and other intractable features that render traditional OFDM receiver architectures far from optimal, and motivated by the success of deep learning in many different challenging applications, various embodiments provide for a design and methodology based on the different neural network architectures for channel estimation and data detection. Various embodiments described herein are with reference to a single antenna receiver and a moderate (e.g., 64) number of subcarriers in a frequency selective fading channel.

Some embodiments of the present technology can be divided into two parts: (i) channel estimation and (ii) data detection. In accordance with some embodiments, a different deep learning model can be used for each part. As such, these specific models can be selected for and adapted to the specifics of these different receiver tasks.

Some embodiments provide an expression to demonstrate that the channel would be estimated perfectly with one-bit ADCs if there was a very large number of pilots. Inspired by this expression, a labeled data set can be produced, and a deep neural network (DNN) can be trained accordingly with a limited number of training symbols for single antenna OFDM receivers. One of the key ideas behind this model is to exploit the generalization property of neural networks to reduce the number of pilot symbols sent over the channel. In what follows, the trained DNN itself generates many output samples whose average gives the estimate of the channel taps in the frequency domain. This yields a generative learning model. Using the formed data set, some embodiments first determine the number of sufficient training symbols for the proposed model, and then quantify its performance in terms of mean square error (MSE). Surprisingly, some embodiments of the channel estimation model for one-bit quantized OFDM samples can give lower MSE than the least squares (LS) channel estimation with unquantized OFDM samples at average SNRs up to 14 dB.

For data detection, some embodiments use a model of the end-to-end OFDM communication system as a single autoencoder to jointly learn a precoder and decoder. However, this autoencoder cannot be trained in an end-to-end manner with the backpropagation algorithm due to the non-differentiable quantization layer. Various embodiments tackle this problem by proposing a two-step sequential training policy. Accordingly, a decoder is first learned offline irrespective of the channel, then the precoder is learned online in conjunction with the trained decoder, taking into account the channel. The simulation results show the efficiency of the proposed method provided that the number of neurons in the hidden layers is moderately increased, which can be achieved by oversampling (still at one-bit resolution) in either the time or frequency domain. In particular, some embodiments can beat the theoretical bit error rate (BER) performance of unquantized QPSK-modulated data symbols in frequency selective Rayleigh fading at average SNRs up to 10 dB when the dimension of the hidden layers before quantization is increased by a factor of 4.

Various embodiments use an autoencoder for OFDM detection. However, these embodiments differ from many traditional autoencoder implementations because there these traditional systems include quantization before detection which creates a non-differentiable layer, and this hinders end-to-end training.

All deep learning-based models for communication systems require to send some number of pilot symbols over the channel, which can decrease the bandwidth efficiency. However, various embodiments use a reasonable number of pilot symbols for the proposed models. This is due to the fact that our design allows receivers to generate its own training symbols to reduce the number pilot symbols sent over the channel as well as offline training. Moreover, various embodiments of the learning models can be realized in receivers in an attempt to provide low power consumption and low hardware costs thanks to the low-bit (e.g., less than six bits, less than 4 bits, one-bit, or the like) ADCs. This can be either in simple mobile user devices or in complex base stations.

Various embodiments of the present technology provide for a wide range of technical effects, advantages, and/or improvements to computing systems and components. For example, various embodiments include one or more of the following technical effects, advantages, and/or improvements: 1) channel estimation via a novel generative supervised deep learning model; 2) data detection via an autoencoder that jointly learns a precoder and decoder; 3) give lower MSE than the least squares (LS) channel estimation with unquantized OFDM samples at average SNRs up to 14 dB; 4) some embodiments can beat the theoretical bit error rate (BER) performance of unquantized QPSK-modulated data symbols in frequency selective Rayleigh fading at average SNRs up to 10 dB when the dimension of the hidden layers before quantization is increased by a factor of 4; 5) use of unconventional and non-routine computer operations to process wireless signals using a low-bit (e.g., less than six bits, less than 4 bits, one-bit, or the like) ADC; 6) multi-part integration of machine learning to more efficiently perform channel estimation and data detection; 7) changing the manner in which a receiver processes signals; 8) use of low bit (e.g., less than 4-6 bit ADCs) to approach the performance of unquantized OFDM; 9) use of a two-step sequential training policy (since quantization prevents end-to-end training); and 10) data detection, that in various embodiments of the design, achieve lower bit error rate (BER) in fading than unquantized OFDM at average SNRs up to 10 dB.

In the following description, for the purposes of explanation, numerous specific details are set forth in order to provide a thorough understanding of embodiments of the present technology. It will be apparent, however, to one skilled in the art that embodiments of the present technology may be practiced without some of these specific details. While, for convenience, embodiments of the present technology are described with reference to a single antenna receiver and a moderate (e.g. 64) number of subcarriers in a frequency selective fading channel, embodiments of the present technology are equally applicable to multiple antenna architectures and/or various numbers of subcarriers in the frequency selective fading channel.

The techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions which may be used to program a computer (or other electronic devices) to perform a process. The machine-readable medium may include, but is not limited to, floppy diskettes, optical disks, compact disc read-only memories (CD-ROMs), magneto-optical disks, ROMs, random access memories (RAMs), erasable programmable read-only memories (EPROMs), electrically erasable programmable read-only memories (EEPROMs), magnetic or optical cards, flash memory, or other type of media/machine-readable medium suitable for storing electronic instructions.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

Throughout this application, the following notation is used: Matrices A and vectors a are designated as uppercase and lowercase boldface letters. $[\bullet]_{k,n}$ corresponds to the entry of a matrix in the $k^{th}$ row and $n^{th}$ column. Transpose and Hermitian operations are demonstrated by $(\bullet)^T$ and $(\bullet)^H$ respectively. The real and imaginary parts are $\Re(\bullet)$ and $\Im(\bullet)$.

Channel Estimation with Low-Bit Adcs

Reliable channel estimation with low resolution ADCs is challenging especially for OFDM, which mainly stems from the increased ICI. To tackle this problem, various embodiments utilize a novel generative supervised learning model. As a general rule, the efficiency of a supervised learning model depends on using an appropriate labeled data set, which is non-trivial. To determine a suitable architecture and labeled data, a theoretical analysis is done. Then, the proposed supervised learning model is grounded to this analysis to enable reliable channel estimation in OFDM receivers with low-bit (e.g., less than six bits, less than 4 bits, one-bit, or the like) ADCs. While various embodiments of the present technology are described with respect to one-bit quantization for concreteness and simplicity of exposition, one of skill in the art would recognize that these concepts extend to low resolution quantization more broadly (e.g., less than six bits per I & Q or similar levels of resolution). Similarly, while various embodiments focus on OFDM as the multicarrier modulation technology, some embodiments of the present technology can also be applied to other related forms of multicarrier modulation and/or frequency domain equalization.

The proposed channel estimator can be combined with a special untrained generative deep neural network to decrease the channel estimation error. Here, special refers to carefully designed deep neural network architecture so as to denoise the signal. The working principle of this special untrained generative deep neural network is to generate the target signal by passing a randomly chosen input tensor which can be considered as an input filled with uniform noise, through hidden layers, whose weights are also randomly initialized, and then optimizing the weights via gradient descent. Here, the input is initially randomly chosen and then kept fixed. On the other hand, the deep neural network parameters are continuously updated. FIG. 1 illustrates an overall deep neural network model 100 that depicts the input 110, hidden layers 120-130, and output 140 for a 3-dimensional communication signal.

Figure 2:
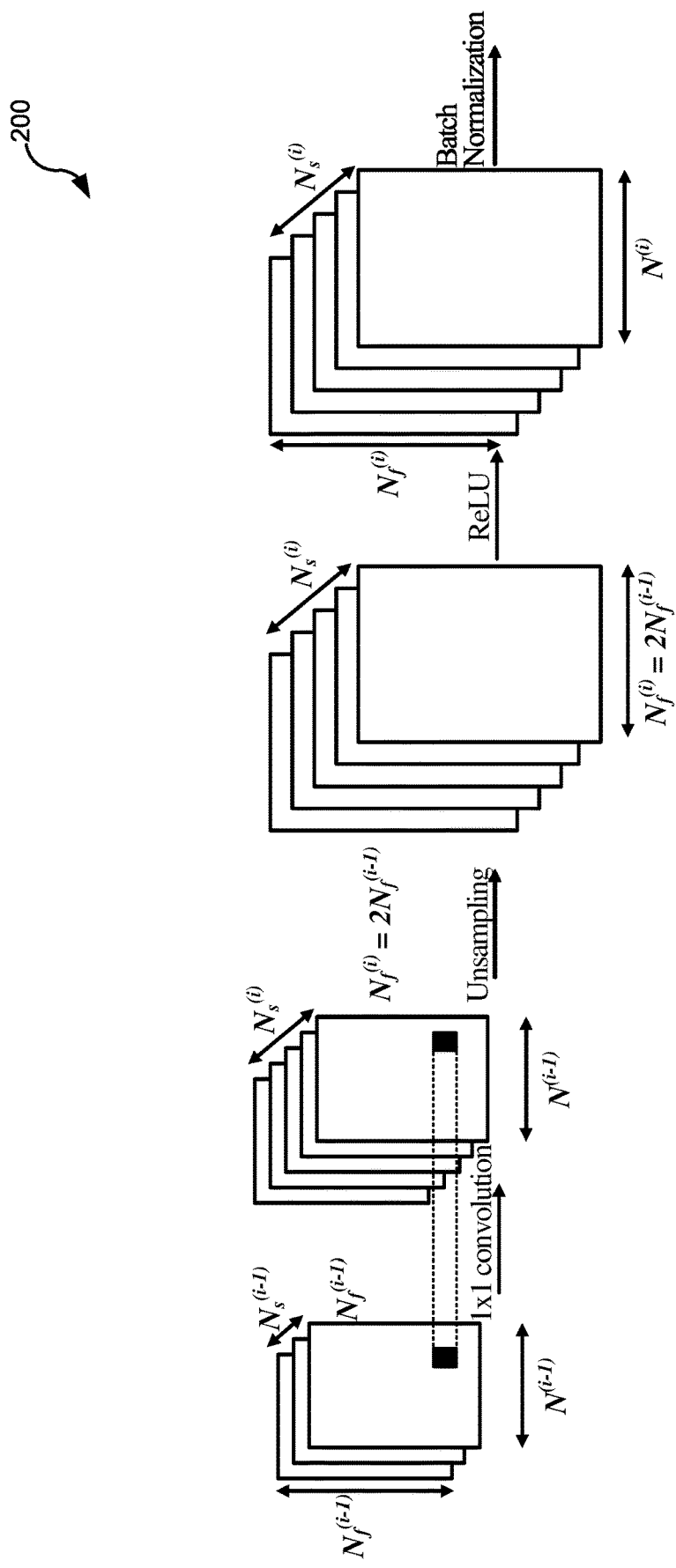
FIG. 2 illustrates an example of the $i^{th}$ hidden layer in a convolution where each element in the time frequency grid is processed with the same parameters through the spatial domain in accordance with various embodiments of the present technology.

The key component in the aforementioned deep neural network model 100 is the hidden layers, which are composed of four major components. These are: (i) a 1_1 convolution, (ii) an upsampler, (iii) a rectified linear unit (ReLU) activation function, and (iv) a batch normalization. A 1_1 convolution means that each element in the time frequency grid is processed with the same parameters through the spatial domain, which changes the dimension. This is illustrated in FIG. 2 for the $i^{th}$ hidden layer 200.

This special generative deep neural network consists of a special deep neural network, namely a deep image prior and deep decoder, accompanied by normal least squares (LS) estimation, in which LS estimation can be before or after the deep neural network.

This special untrained generative deep neural network fits the parameters of its neural layers according to its input adaptively, i.e., uniquely for each input. This special untrained generative deep neural network does not require training and hence a training dataset. This makes it lower complexity with respect to a standard deep neural network. This special unsupervised deep neural network can be used alone as a separate channel estimation and for channel estimation for single antenna and multiple antenna systems.

This special unsupervised deep neural network can be used for channel estimation for single carrier and multi-carrier systems. This special unsupervised deep neural network can be used for low-resolution and high-resolution ADCs, and bring gains for both cases in terms of performance and complexity.

A. One-Bit OFDM Signal Analysis

Figure 3:
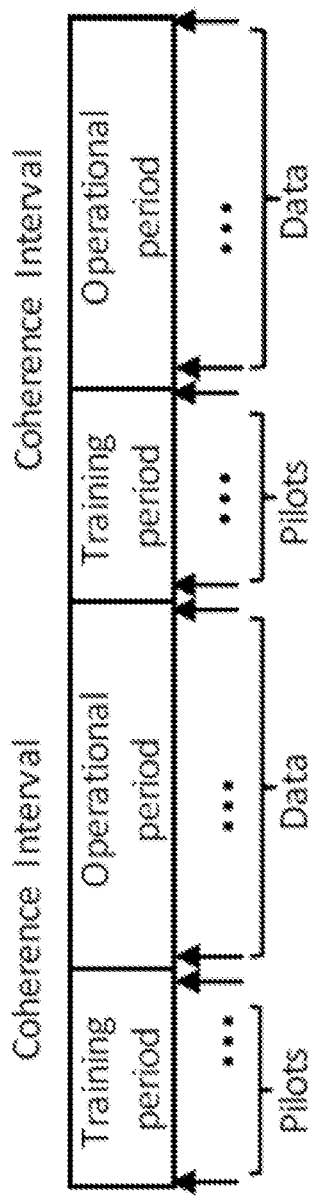
FIG. 3 illustrates an example of a block fading channel model, in which data follows the pilots, and channel changes independently among blocks in which some embodiments of the present technology may be utilized.

It is not uncommon for the channel to experience block fading as demonstrated in FIG. 3. This channel is estimated through the pilot symbols $s_p$. These pilots are sent before data transmission starts at the beginning of each channel coherence time interval. The pilot symbols are multiplied by a normalized inverse discrete Fourier transform (IDFT) matrix, and transmitted over the dispersive channel after appending a cyclic prefix (CP). This can be expressed in complex matrix-vector form as $$y_p = HF^H s_p + n \quad (1)$$

where $s_p = [s_{p_0} s_{p_1} \ldots s_{p_{N-1}}]^T$, F is the normalized DFT matrix and so $F^H$ is the normalized IDFT matrix, H is the N×N circulant channel matrix assuming that CP is removed at the receiver, and n is the zero-mean additive white Gaussian noise (AWGN) with variance $\sigma_n^2$. It is well-known that a circulant channel matrix has eigen decomposition $$H = F^H \Lambda F \quad (2)$$

where $\Lambda$ is a diagonal matrix whose entries indicate the channel taps in the frequency domain, i.e., $$H_i = \Lambda_{i,i} \quad (3)$$

for i=0, ..., N−1.

One-bit quantization of (1) with a pair of one-bit ADCs to quantize the real and imaginary part separately results in $$r_p = Q(y_p) = \frac{1}{\sqrt{2}} \text{sign}(\mathcal{R}(y_p)) + \frac{j}{\sqrt{2}} \text{sign}(\mathcal{J}(y_p)). \quad (4)$$

Outputs of an OFDM transmitter are time domain samples that can be well approximated by a Gaussian distribution, and any nonlinear function of a Gaussian signal can be expressed as $$r_p = Ay_p + d \quad (5)$$

wherein the matrix A makes $y_p$ and d uncorrelated due to Bussgang's theorem. That is, $$E[d y_p^H] = E[d] E[y_p^H] \quad (6)$$

where d denotes the quantization distortion.

Lemma 1. The quantization distortion and the pilots are uncorrelated, and $$E[d s_p^H] = 0. \quad (7)$$

Proof. Taking the expected value of (1) yields $$E[y_p] = 0 \quad (8)$$

because $E[s_p] = 0$ and $E[n] = 0$. Substituting (8) in (6) gives $$E[d y_p^H] = 0. \quad (9)$$

Since the quantization distortion and channel noise are uncorrelated, using (1) in (9) trivially implies (7).

Theorem 1. The diagonal matrix A can be obtained from the one-bit observations and pilots as $$E[FQ(y_p) s_p^H] = \sqrt{\frac{2\rho^2}{\pi(\rho/N + \sigma_n^2)}} \Lambda \quad (10)$$

where

-continued $$\rho = \frac{E[s_p^H s_p]}{N}. \quad (11)$$

Proof. (From A. Papoulis and S. U. Pillai, Probability, Random Variables, and Stochastic Processes, Tata McGraw-Hill Education, 2002, which is hereby incorporated by reference in its entirety for all purposes)

$$A = \sqrt{\frac{2}{\pi}} \left[ diag(C_{y_p}) \right]^{-\frac{1}{2}} \quad (12)$$

where $diag(C_{y_p})$ refers to the diagonal matrix composed of the diagonal terms of $C_{y_p}$, which is $$C_{y_p} = E[y_p y_p^H]. \quad (13)$$

Expressing (13) in terms of (1), and using $$E[F^H s_p s_p^H F] = \rho/N I_{N \times N}. \quad (14)$$

gives $$A = \sqrt{\frac{2}{\pi(\rho/N + \sigma_n^2)}} I_N \quad (15)$$

Expanding (10) using (5) results in $$E[FQ(y_p)s_p^H] = FAE[y_p s_p^H] + FE[d s_p^H] \quad (16)$$

$$\stackrel{(a)}{=} FAE[y_p s_p^H]$$

$$\stackrel{(b)}{=} \sqrt{\frac{2}{\pi(\rho/N + \sigma_n^2)}} FE[y_p s_p^H]$$

where (a) is due to Lemma 1, (b) is due to (15). Substituting $$E[y_p s_p^H] = \rho H F^H \quad (17)$$

and using (2) completes the proof of (10).

This proof shows that in principle the channel can be estimated perfectly with a very large number of pilots that are sent for each channel coherence time interval with one-bit ADCs. More precisely, if a large number of pilots are sent to estimate the channel, and each of these pilots is multiplied with the corresponding one-bit observation and the normalized DFT matrix, then taking the average of these terms can produce the $\Lambda$ scaled by a constant due to Theorem 1. Since $\Lambda$ is a diagonal matrix whose entries are the channel taps in the frequency domain, estimating $\Lambda$ is equivalent to estimating the channel.

B. Supervised Learning Model

If there were many pilots in each channel coherence interval, the channel could be estimated perfectly. However, the number of pilots should be minimized to conserve bandwidth and power. Thus, various embodiments utilize a supervised channel learning model based on the idea of implementing (10) with a DNN. One reason some embodiments use a DNN architecture is associated with the generalization capability of DNNs, which greatly reduces the number of pilots that are necessary.

Figure 4:
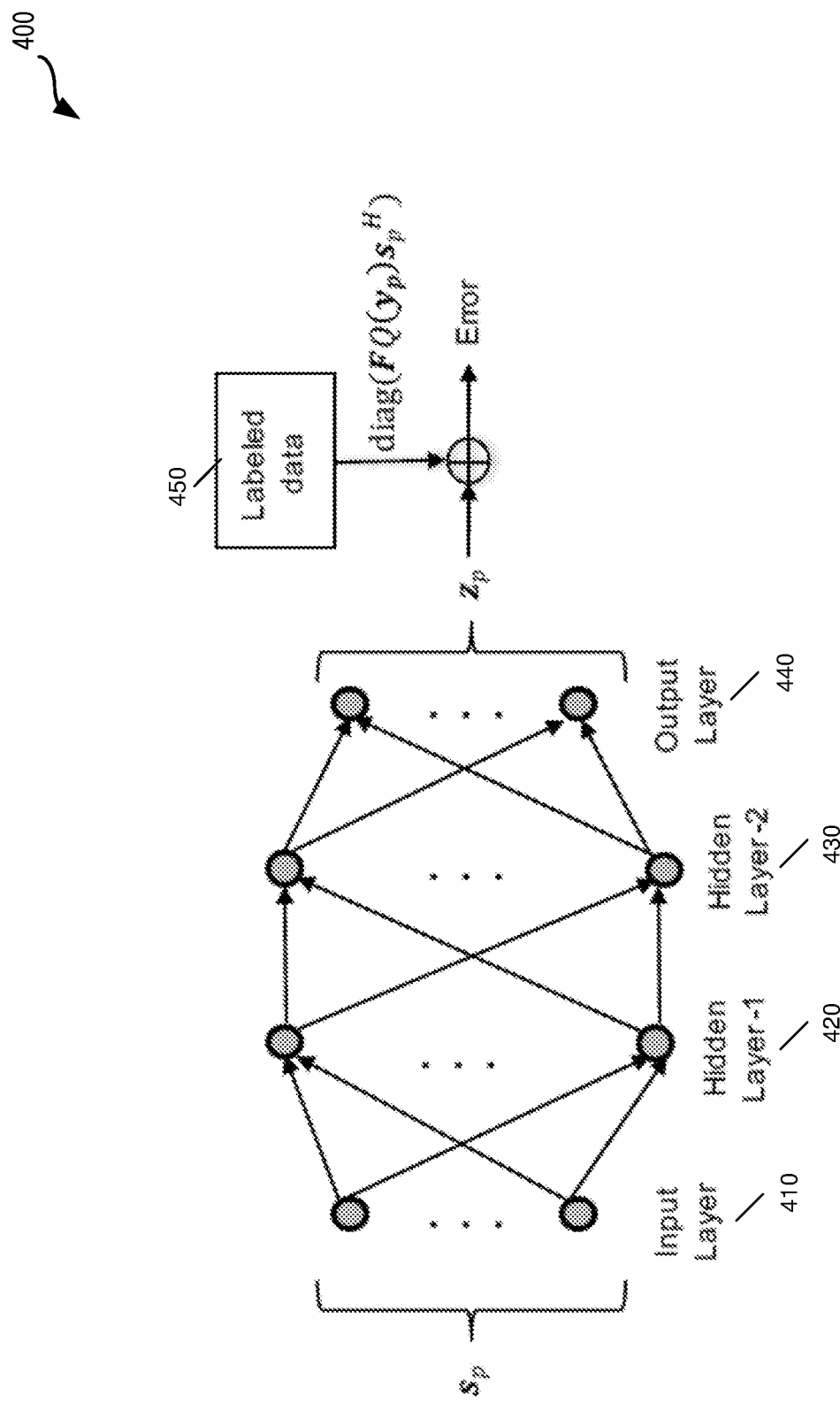
FIG. 4 illustrates a DNN with the inputs, outputs and labeled data according to one or more embodiments of the present technology.

The proposed DNN architecture is trained with special labeled data, in particular with the diagonals of the matrix $FQ(y_p)s_p^H$. That is, the labeled data is produced via the pilot symbols and the corresponding one-bit quantized observations. Some embodiments of this architecture 400 is given in FIG. 4, which is composed of an input layer 410, 2 hidden layers 420 and 430, and an output layer 440. The input layer 410 takes the pilots $s_p$ and produces the corresponding output $z_p$ such that $p=1,\ldots,N_t$ where $N_t$ is the total number of pilots transmitted over the channel for one coherence interval. $z_p$ can be written in terms of the trainable weights or network parameters and activation functions as $$z_p = \sigma_3(\Theta_3 \sigma_2(\Theta_2 \sigma_1(\Theta_1 s_p))). \quad (18)$$

The parameters can be optimized to learn the probability distribution of the labeled data according to the following cost function $$J = \min_{\Theta_1, \Theta_2, \Theta_3} \| z_p - diag(FQ(y_p)s_p^H) \|^2 \quad (19)$$

which can be solved, for example, with gradient descent via the backpropagation algorithm.

The layers 410, 420, 430, and 440, their types, sizes, activation functions and weights are summarized in Table I. Since state-of-the-art software libraries that implement neural networks do not support complex operations, the real and imaginary part of the complex vectors are concatenated to obtain a 2N×1 real vector. Without loss of generality, the dimension of the hidden layers 220 and 230 can be taken to be twice that of the input and output layer, giving $32N^2$ trainable parameters, which increases quadratically with the number of subcarriers. Rectified linear unit (ReLU) can be used in the hidden layers 420 and 430 as an activation function for fast convergence, and a linear activation function can be utilized at the output layer 440, because this is a regression task. Matrices specify the weights between the two layers.

TABLE I

THE PROPOSED DNN ARCHITECTURE FOR
CHANNEL ESTIMATION WITH 1 BIT ADC

| Layer | Type | Size | Activation | Weights |
|---|---|---|---|---|
| Input Layer | Pilot Symbols | 2N | — | — |
| Hidden Layer-1 | Fully Connected | 4N | ReLU | $\Theta_1$ |
| Hidden Layer-2 | Fully Connected | 4N | ReLU | $\Theta_2$ |
| Output | Fully Connected | 2N | Linear | $\Theta_3$ |

In accordance with various embodiments, the DNN can be trained to minimize the MSE between the outputs and the labeled data 450. This implies that the learned probability distribution can approximate the probability distribution of $diag(FQ(y_p)s_p^H)$. It is worth emphasizing that our aim is to generate samples from this learned distribution instead of making regression or classification via $p(z_p | s_p; \Theta)$, where $\Theta = \{\Theta_1, \Theta_2, \Theta_3\}$. More specifically, some embodiments generate as many output samples as needed from the learned distribution in response to random inputs within the same channel coherence interval, and take their average to estimate the channel in accordance with (10). The generated output samples for the random inputs do not cost anything other than some extra processing, because these inputs are not coming from the channel; rather they are generated randomly in the receiver. This makes some embodiments of the supervised learning model a generative model.

To be more precise, various embodiments of the trained DNN generates some output samples $z_t$ in response to the random inputs $s_i$. In what follows, the channel taps in the frequency domain are estimated as $$\hat{H} = \frac{1}{M}\sum_{i=0}^{M-1} z_i \qquad (20)$$

where $\hat{H}=[\hat{H}_0 \ldots \hat{H}_{N-1}]$. Note that M is the total number of arbitrarily generated output samples. There is no constraint to limit M except the processing complexity, i.e., the $z_i$ does not consume any bandwidth. Note that at each time the channel changes, the model must be retrained with $N_t$ pilots, and M randomly generated samples after training the DNN with the pilots.

Data Detection with One-Bit ADCs

Figure 5B:
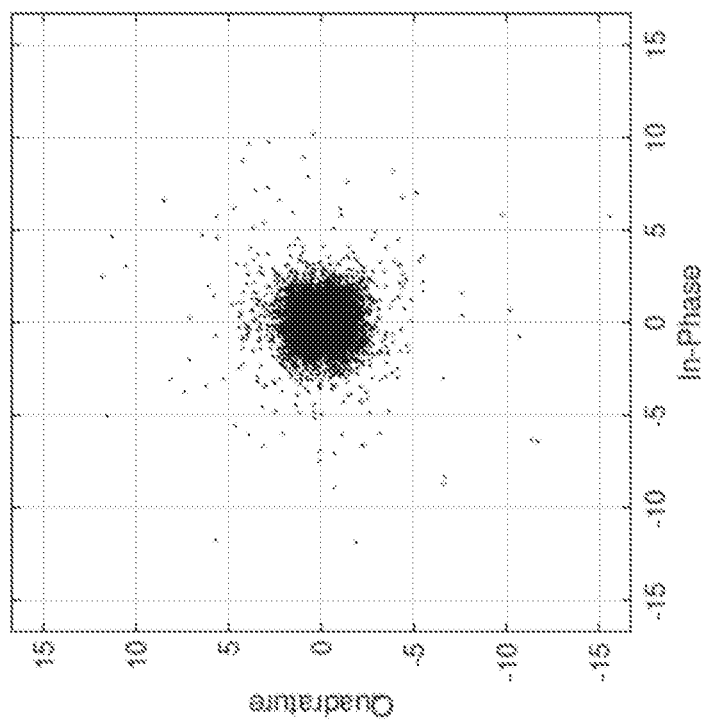
FIG. 5B illustrates constellation diagram of the QPSK modulated OFDM symbols received at 20 dB SNR for a one-bit quantization applied separately for the in-phase and quadrature terms in accordance with various embodiments of the present technology.
Figure 5A:
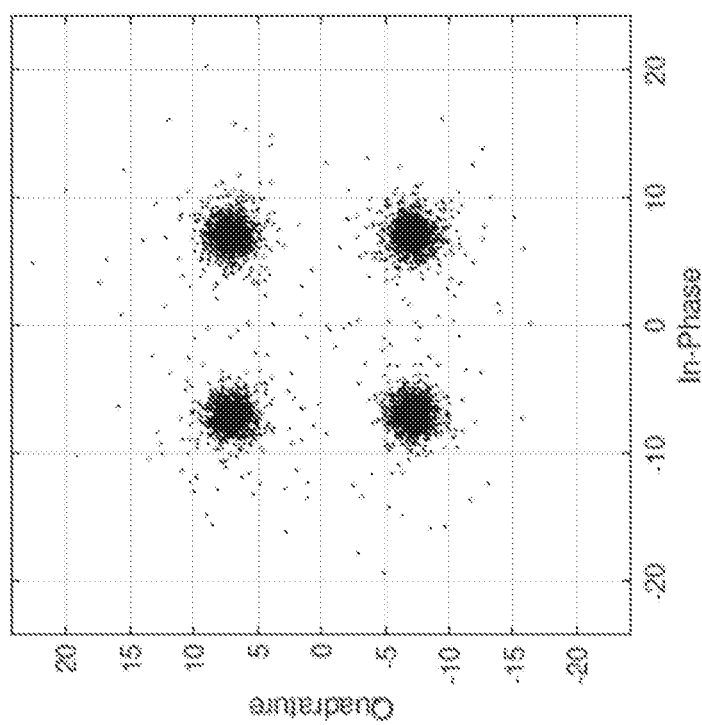
FIG. 5A illustrates a constellation diagram of the QPSK modulated OFDM symbols received at 20 dB SNR for the an ideal unquantized case.

Reliably detecting the OFDM symbols with one-bit ADCs is extremely difficult even if channel is estimated and equalized perfectly because of the resulting severe intercarrier interference (ICI). The ICI results because quantization in the time domain disrupts the orthogonality between the subcarriers in the frequency domain. For example, consider QPSK modulated OFDM symbols transmitted over a 10-tap frequency selective channel at 20 dB SNR. This yields the constellation diagram given in FIG. 5A and FIG. 5B for the unquantized and one-bit quantized received samples assuming that the channel is perfectly estimated and equalized for both cases. It does not seem possible to reliably detect these QPSK symbols with one-bit ADCs.

To have a satisfactory error rate for the detection of OFDM symbols with one-bit ADCs, the main idea is to jointly learn a precoder and decoder. Various embodiments use an autoencoder, which is a powerful unsupervised deep learning tool. More precisely, the end-to-end OFDM communication system can be treated as a single autoencoder to jointly learn a precoder and decoder. The main challenge related with this approach surfaces in training. Specifically, one-bit ADCs lead to a non-differentiable layer in the autoencoder, which hinders the training of the parameters. Various embodiments handle this issue via a novel two-step sequential training policy.

An autoencoder aims to copy its inputs to the outputs by decreasing the signal dimension in the hidden layers, which avoids trivially copying the inputs to the outputs, and enforces a sparse representation of the input. By this is meant that autoencoders can reconstruct the output from a low-dimensional representation of input at some hidden layer by learning an encoder and decoder. This is a good match for the current problem, in which the transmitted OFDM symbols are detected using the one-bit quantized observations with the help of a precoder and decoder. Here the analogy is that the OFDM symbols correspond to the inputs, the one-bit quantized data is a hidden layer, and the outputs represent the detected symbols.

Figure 6:
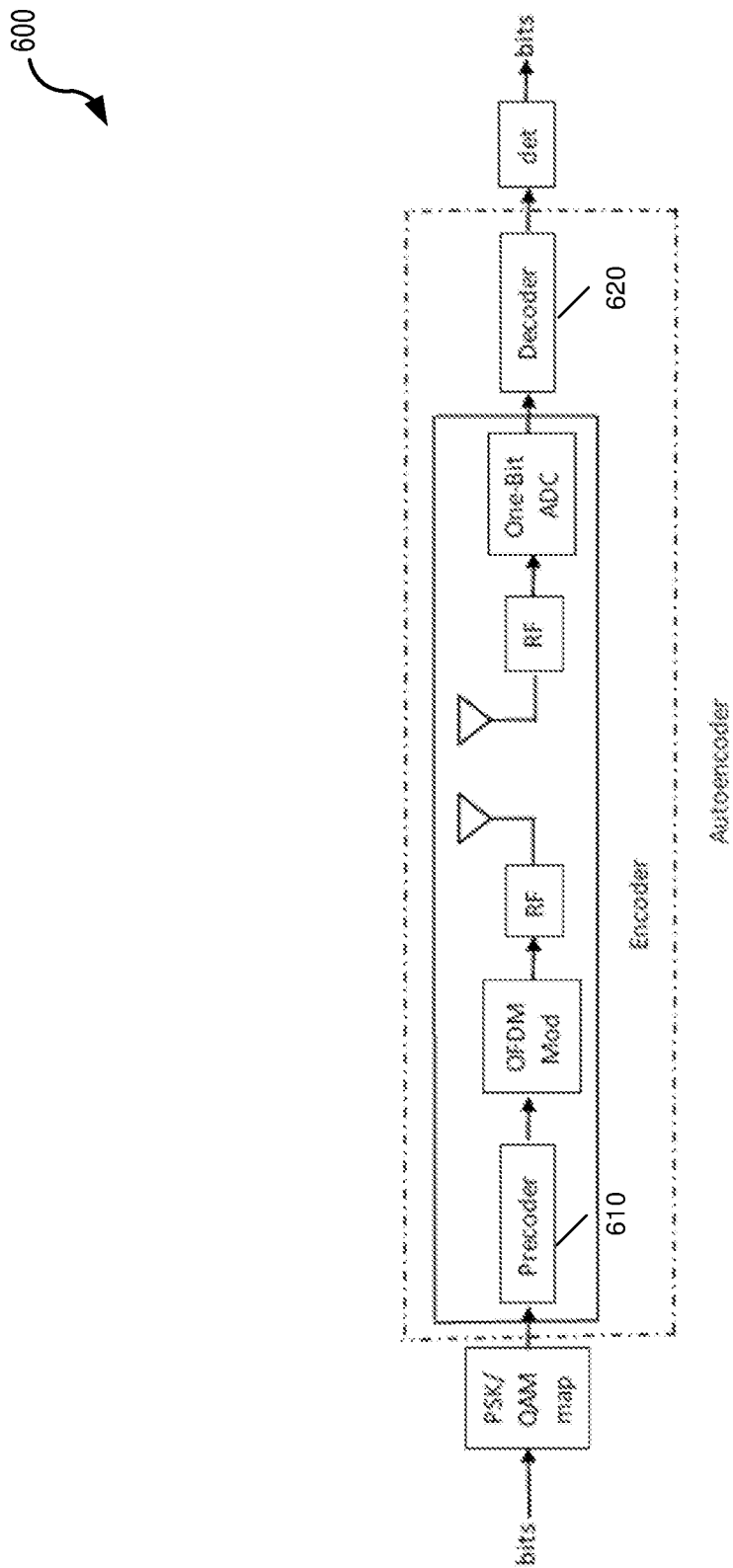
FIG. 6 illustrates a set of components within an autoencoder for OFDM systems with one-bit ADCs according to one or more embodiments of the present technology.

To make use of an autoencoder for OFDM detection, the main building blocks, which are the encoder and decoder, have to be adapted. Therefore, the learned precoder P, OFDM modulator (which is realized as an IDFT), channel H, noise and quantizer can be seen collectively as an encoder. The decoder corresponds to the post-processing after quantization at the receiver. This model 600 is shown in FIG. 6, and termed as AE-OFDM, which is consistent with state-of-the-art OFDM transceivers except the precoder 610 and decoder 620 are now implemented as artificial neural networks.

In AE-OFDM, the modulated symbols at the N subcarriers, i.e., $s_k$ for k=0, 1, ..., N−1 are multiplied with a linear precoder matrix in the frequency domain, which will be learned through training. This leads to $$x=Ps \qquad (21)$$

where $P \in \mathbb{C}^{N \times N}$ is the frequency domain precoder matrix, and $s=[s_0 s_1 \ldots s_{N-1}]^T$. Crucially, the pilot symbols are not multiplied by a precoder matrix in channel estimation, since the precoder is designed according to the channel, i.e., after channel estimation. In what follows, an IDFT is applied to the precoded symbols, and transmitted over a dispersive channel that has L time domain taps such that L<N. This results in $$y=HF^H x + n \qquad (22)$$

which is similar to (1) except the pilot symbols $s_p$ are replaced with x. How the channel taps can be estimated via deep learning was given in (20).

One-bit quantization of (22) with a pair of ADCs for the in-phase and quadrature components provides the input to the decoder $$r=Q(y) \qquad (23)$$

such that $Q(\cdot)$ is applied element-wise. The decoder D 420 can be a multi-layer neural network whose aim is to reconstruct s from r. Specifically, $$s'=\sigma_Z(W_Z \ldots \sigma_2(W_2 \sigma_1(W_1 r))) \qquad (24)$$

where Z is the number of layers and $\sigma_z$ is the activation function for layer z applied element-wise for vectors. The dimension of the parameter matrices is $$dim(W_s) = \begin{cases} l_z \times dim(y), & z=1 \\ l_z \times l_{z-1}, & z=2, \cdots, Z-1 \\ N \times l_{Z-1} & z=Z \end{cases} \qquad (25)$$

Figure 7:
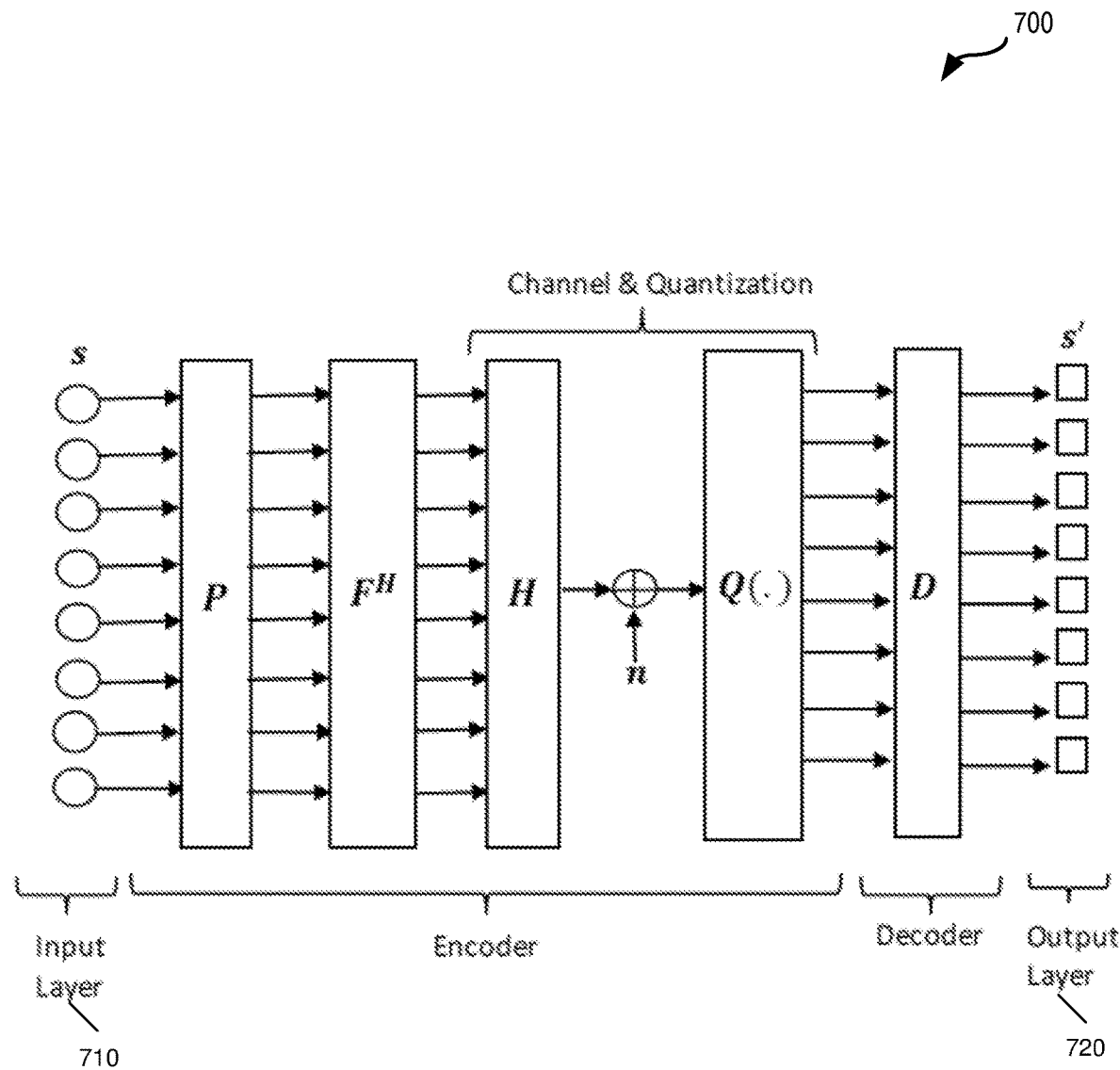
FIG. 7 is a block diagram illustrating an example of an AE-OFDM architecture with one-bit quantization in accordance with some embodiments of the present technology.

In summary, the end-to-end AE-OFDM architecture 700 from the transmitter to the receiver can be divided into logical blocks as depicted in FIG. 7. Here, the modulated symbols are treated as an input layer 710 and the detected symbols constitute the output layer 720. AE-OFDM 700 eliminates the need at the receiver for an explicit DFT and equalization, because they are implicitly learned. The next step is to learn the neural network precoder P and decoder D by properly training the model.

B. Training

Autoencoders are trained to minimize the reconstruction loss or the sum-of-squares error function between the input and output layer, which corresponds to $$e=\|s-s'\|^2 \qquad (26)$$

where $s'=[s_0' s_1' \ldots s_{N-1}']^T$. The parameters of the neural layers in the precoder and decoder are trained according to this error function as $$W_{k,l}^{(n+1)} = W_{k,l}^{(n)} - \mu \frac{\partial e}{\partial W_{k,l}^{(n)}}, \qquad (27)$$

where $W_{k,l}^{(y,b)}$ indicates the $l^{th}$ neuron at the $k^{th}$ layer in the nth iteration and μ is the learning rate.

The gradient of the error is evaluated using a local message passing scheme among layers known as backpropagation. However, the quantization layers or $Q(\cdot)$ stymies the backpropagation, because its derivative is 0 everywhere except that the point at 0 that is not even differentiable. Thus, any neural layer before Q(•), which corresponds to the precoder, cannot be trained. Hence, a novel training policy is needed for the AE-OFDM model.

Various embodiments of the present technology use a two-step sequential learning model is proposed to train the AE-OFDM instead of end-to-end training. In the first step, the decoder is trained without explicitly considering the channel and OFDM modulator. In the second step, the precoder is learned to be compatible with the trained decoder taking into account the channel and OFDM modulator. An apparent advantage of this training policy lies in the fact that the decoder can be trained offline, which brings significant complexity savings. On the other hand, the precoder has to be learned online at each time the channel changes. This can be done with a reasonable pre-determined number of training samples with a small size neural network following the channel estimation. In particular, both the decoder and precoder can be trained with multiple (e.g., 5000) samples for an OFDM system that has 64 subcarriers. Note that this does not mean that 5000 pilots symbols are sent over the channel, as will be explained below.

Figure 8:
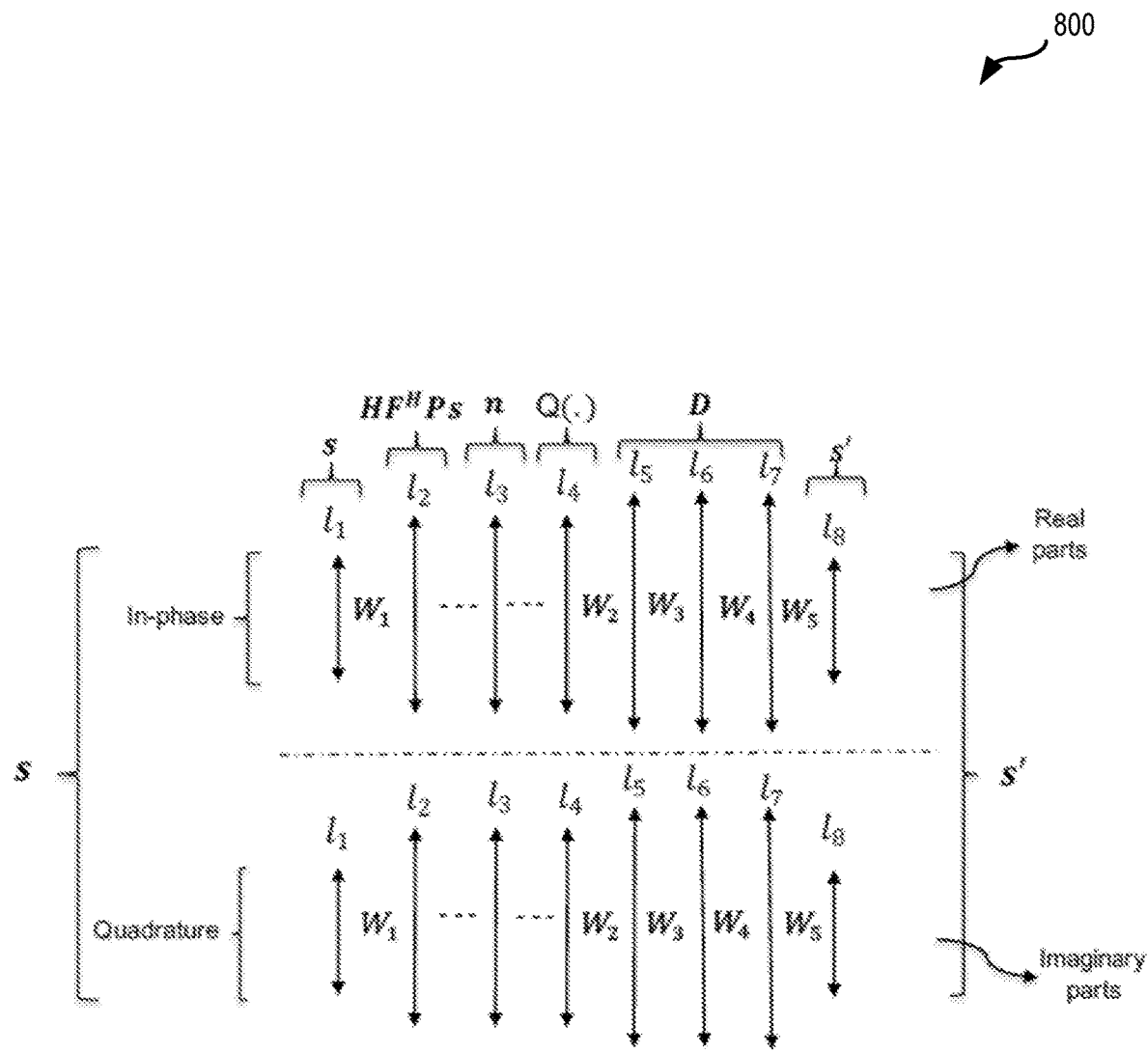
FIG. 8 illustrates an example of an end-to-end layered architecture of an AE-OFDM that may be used in accordance with one or more embodiments of the present technology.

For the decoder, the complex baseband signal is divided into real and imaginary parts, each of which is processed separately with the same set of parameters. That is, there is parameter sharing, which is one of the key concepts behind the success of deep learning. The rationale behind parameter sharing is to decrease the complexity. To be specific, some embodiments of an overall end-to-end model 800, including all layers from $I_1$ to $I_8$, is given in FIG. 8. Notice that each layer is composed of two parts. More precisely, $I_i$ for i=1, . . . , 8 can be considered as a single vector, wherein the first half corresponds to the in-phase components of the symbols or the real part of the complex baseband signal shown as $I_{iI}$, and the second half represents the quadrature or imaginary part represented by $I_{iQ}$. Here, $W_1$, $W_2$, $W_3$, $W_4$, $W_5$ demonstrate the shared parameters.

The further details of the AE-OFDM architecture including the layer types, sizes, activation functions and trainable weights of layers are illustrated in Table II considering the in-phase and quadrature parts separately. The layers before quantization can have a higher number of neurons than the input to make the learning more efficient, i.e., their size is GN such that G≥1. This can be achieved with oversampling. Similarly, the decoder layers have a high dimension as KN, in which K is taken 20 without any loss of generality. Note that our empirical observations demonstrate that the value of G affects the performance much more than K. Hence, the results are obtained for different values of G={1, 2, 4}. At the output, a linear activation function is used, and thus a continuous valued vector with N terms is obtained. Each term of this vector is individually mapped to one of the constellation points according to the minimum Euclidean distance criterion. This greatly reduces the dimension of the output when compared to using softmax activation function at the output in conjunction with a one-hot encoding, since this requires a $2^N$ dimensional output vector.

Although the received complex OFDM baseband signal can be trivially broken into real and imaginary parts for decoder, it is not straightforward to divide the signal at the transmitter. This is associated with the OFDM modulation that mixes the in-phase and quadrature parts of the modulated symbols via the IDFT. This challenge is inherently handled while training the precoder, in which various embodiments can implement a simple supervised learning model by using the $I_2$ layer of the decoder as a labeled data set for the input $I_1$.

Figure 9:
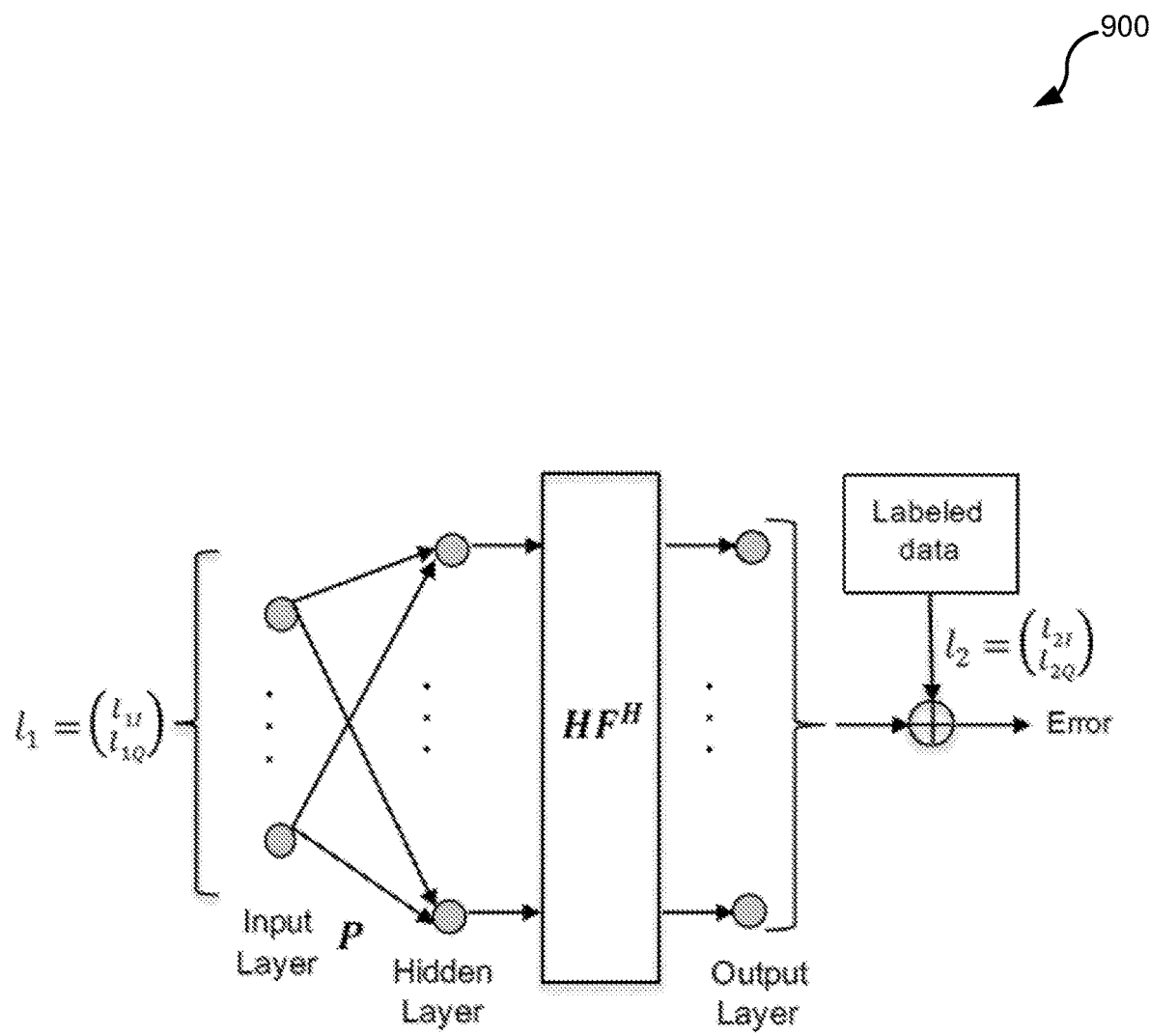
FIG. 9 illustrates an example of a supervised learning model for a precoder that uses the $I_1$ and $I_2$ layers of a decoder in the training phase according to some embodiments of the present technology.

A supervised learning model 900 is formed to train the precoder whose model is presented in FIG. 9. During the training of decoder, the real and imaginary parts of $I_1$ and $I_2$ are concatenated to obtain a real vector with dimension 2N. Then, these values of $I_1$ and $I_2$ layers are stored to create a data set to train the precoder such that $I_1$ constitutes the input data, and $I_2$ is used for labeled data. In this model, the inputs are processed with a neural layer, which corresponds to the precoder. Then, the precoded symbols are transformed to another vector by multiplying it with $HF^H$. Since the precoder is trained after estimating the channel, H is already known. The primary aim of this model is to learn the output samples with respect to the labeled data set through the learned precoder. Theoretically, the labeled data set can be very well approximated with the outputs, because in this case there are no factors that limit the learning such as noise, data impediments, or dimension reduction.

TABLE II

AE-OFDM MODEL AND LAYERS

| Layer | Layer Type | Size | Activation | Weights |
|---|---|---|---|---|
| $l_{1I}, l_{1Q}$ | Input | Input Symbols | N | — | — |
| $l_{2I}, l_{2Q}$ | Precoder IDFT Channel | Fully Connected | GN | Linear | $W_1$ |
| $l_{3I}, l_{3Q}$ | Noise | Vector | GN | — | |
| $l_{4I}, l_{4Q}$ | Quant | Sign Function | GN | — | |
| $l_{5I}, l_{5Q}$ | Decoder | Fully Connected | KN | ReLU | $W_2$ |
| $l_{6I}, l_{6Q}$ | | Fully Connected | KN | ReLU | $W_3$ |
| $l_{7I}, l_{7Q}$ | | Fully Connected | KN | ReLU | $W_4$ |
| $l_{8I}, l_{8Q}$ | Output | Fully Connected | N | Linear | $W_5$ |

C. Practical Challenges

The channel varies according to the block fading model so the precoder parameters have to be retrained each time the channel changes. This can bring excessive training symbol overhead. As a worst case assumption, each OFDM symbol could be required to occur at least once in the training phase. This would require at least $2^N$ pilots, which in our case would be greater than $10^{19}$. This shows the generalization capability of the DNN that will be trained with just 5000 symbols in this paper for N=64. However, this number of pilots is still impractical in terms of bandwidth efficiency.

To address this problem, some embodiments train the precoder at the receiver after estimating the channel. Then, the learned precoder can be notified to the transmitter before data transmission begins. This brings the flexibility of training the model with as many samples as needed without decreasing the bandwidth efficiency due to additional pilots. The main drawback of this training model can be some extra processing at the receiver. However, this complexity can be handled using stochastic computing-based hardware implementations. Another solution can be to train the precoder parameters at the transmitter after the receiver sends the channel information to the transmitter. This can be especially useful in downlink communication. With this approach, there is no need to do training in the receiver, since the precoder is trained in the transmitter and the decoder parameters are trained offline.

D. Implementation

Once the precoder and decoder can be trained after estimating the channel through pilot symbols, AE-OFDM becomes ready for data communication. In the data phase, the symbols are first multiplied with the learned precoder matrix. The precoded symbols can be normalized to ensure the average transmission power constraint, and then multiplied with the IDFT and channel matrix, respectively, which forms the $I_2$ layer. In what follows, $I_2$ is divided into real and imaginary parts. To obtain $I_3$, AWGN is added both for the real and imaginary parts, and the resultant samples are quantized in $I_4$. Lastly, the decoder processes the data via $I_5$, $I_6$, $I_7$, and outputs are obtained at $I_8$. The decoded symbols are mapped to the closest constellation point according to the minimum Euclidean distance criterion.

The layered model gives an abstract view of AE-OFDM, which means that it can be implemented in many different ways in practical transceivers, in particular, depending on how the input dimension is increased when G>1. Adding redundant subcarriers, employing multiple antennas, oversampling in the time and/or in frequency domain are methods to increase the input dimension. Some embodiments use oversampling methods, wherein G is treated as the oversampling factor so that AE-OFDM can be realized by either time domain oversampling or frequency domain oversampling, which is discussed in turn.

1) Time Domain Oversampling: The discrete-time received signal can be written as $$y_n = \sum_{l=0}^{L-1} h_l x_{n-l} + n_n \qquad (28)$$

where $h_l$ is the channel taps in the time domain, $n_n$ is the complex Gaussian noise as $CN(0,\sigma_N^2)$, and $$x_n = \frac{1}{\sqrt{N}} \sum_{k=0}^{N-1} X_k e^{j2\pi kn/N} \qquad (29)$$

in which $X_k$ is the precoded symbol in the frequency domain.

The received continuous-time complex signal can be expressed analogous to (28) as $$y(t) = \frac{1}{\sqrt{N}} \sum_{k=0}^{N-1} H_k X_k e^{j2\pi kt/T} + n(t) \qquad (30)$$

where T is the OFDM symbol period, and $$H_k = \sum_{l=0}^{L-1} h_l e^{-j2\pi kl/N}. \qquad (31)$$

This signal is sampled at time instances $t=nT_s+gT_s/G$ where $T_s=T/N$ and $g=0, 1 \ldots G-1$, which produces $$y_{n_0}=y(nT_s+gT_s/G). \qquad (32)$$

Expressing (32) in matrix-form leads to $$y=H_{tos}F^H P_{tos}s+n \qquad (33)$$

where $y=[y_0 y_1 \ldots y_{G-1}]^T$ such that $y_g=[y_{g_0} y_{g_1} \ldots y_{g_{N-1}}]^T$, and $$H_{tos} = \begin{bmatrix} F^H E_0 F H_{srs} \\ \vdots \\ F^H E_{G-1} F H_{srs} \end{bmatrix} \qquad (34)$$

where $$E_g = diag(1, e^{j2\pi g/GN}, e^{j4\pi g/GN}, \ldots, e^{j2\pi(N-1)g/GN}).$$

Hence, the oversampled channel matrix $H_{tos}$ can be written in terms of the symbol rate sampled channel matrix $H_{srs}$, which becomes GN×N, where G shows the time domain oversampling factor. In this case, the precoder matrix $P_{tos}$ remains complex N×N matrix as $F^H$. Note that $P_{tos}$ can be learned according to $H_{tos}$, and this results in $$s_2 H_{tos} F^H P_{tos} s_1 \qquad (35)$$

where $s_1=I_{1I}+jI_{1Q}$ and $s_2=I_{2I}+jI_{2Q}$. In what follows, the real and imaginary parts of $s_2$ are concatenated to obtain the real vector $I_2$ that is used by the decoder to detect the transmitted symbols.

2) Frequency Domain Oversampling: Zeros are padded at the transmitter before IDFT to realize frequency domain oversampling. This obviously increases the block size of the IDFT by a factor G. In this case, the precoder matrix is found according to the frequency domain oversampled channel, and this produces $$s_2=H_{fos}F_{fos}^H P_{fos}s_1 \qquad (36)$$

where $P_{fos}$ is a N×N matrix, and $$\Gamma = \begin{bmatrix} 1_{N\times N} \\ 0_{(G-1)N\times N} \end{bmatrix}.$$

Further, $H_{fos}$ and $F_{fos}$ are GN×GN matrices.

AE-OFDM can also be implemented as a combination of time and frequency domain oversampling, and the precoder matrix can be found accordingly. In this case $$G=G_t G_f \qquad (37)$$

where $G_t$ and $G_f$ denote the oversampling factor in time and frequency domain, and the matrix representations can be obtained trivially via the derived expressions. To summarize, AE-OFDM can be implemented in many different ways, and this choice depends on the requirements of communication schemes. For example, if AE-OFDM operates in the sub 6-GHz with moderate bandwidth, time domain oversampling can be done without increasing the power consumption much due to the increased sampling rate. On the other hand, frequency domain oversampling can be preferred for mmWave transmissions that provides large bandwidth, in which the high sampling rate can be too costly regarding the power consumption at the expense of implementing longer IDFT and DFT.

Simulations

Various embodiments of the generative supervised deep learning model for channel estimation, and unsupervised autoencoder model for data detection were evaluated using tensors to make use of TensorFlow framework while implementing neural layers. Note that a tensor can be viewed as n-dimensional arrays involving matrices or vectors, in which TensorFlow can run computations over them. The efficiency of the proposed models were assessed by generating a synthetic data for the transmitted symbols, wireless channel and noise. It is assumed that transmitted symbols are QPSK modulated, wireless channel taps are complex Gaussian, and they have uniform power delay profile. Noise samples are additive white Gaussian random variables. There are 64 subcarriers in one OFDM block, i.e., N=64. This is consistent with IEEE 802.11a/g/n/ac, and LTE, in which a given UE might only have about 64 subcarriers. For the models, the performance metric for channel estimation is MSE, and it is BER for data detection.

A. Channel Estimation

The DNN model for the channel estimation given in Table I was trained with 3 different number of training symbols or pilots transmitted over the channel as $N_t=\{10,20,25\}$ to determine the sufficient number of training symbols. In training, gradient descent was used with an adaptive learning rate, wherein gradients are found with backpropagation algorithm, and Adam optimizer is employed to have an adaptive learning rate whose initial learning rate is 0.01. Once DNN is trained according to this setting, 10000 randomly generated input samples are given to the DNN, i.e., M=10000 and their corresponding 10000 outputs are averaged to estimate the channel taps in frequency domain. This simulation was repeated for 100 different channel realizations. Then, its performance is compared with the state-of-the art LS channel estimation for unquantized OFDM samples and one-bit quantized OFDM samples.

Figure 10A:
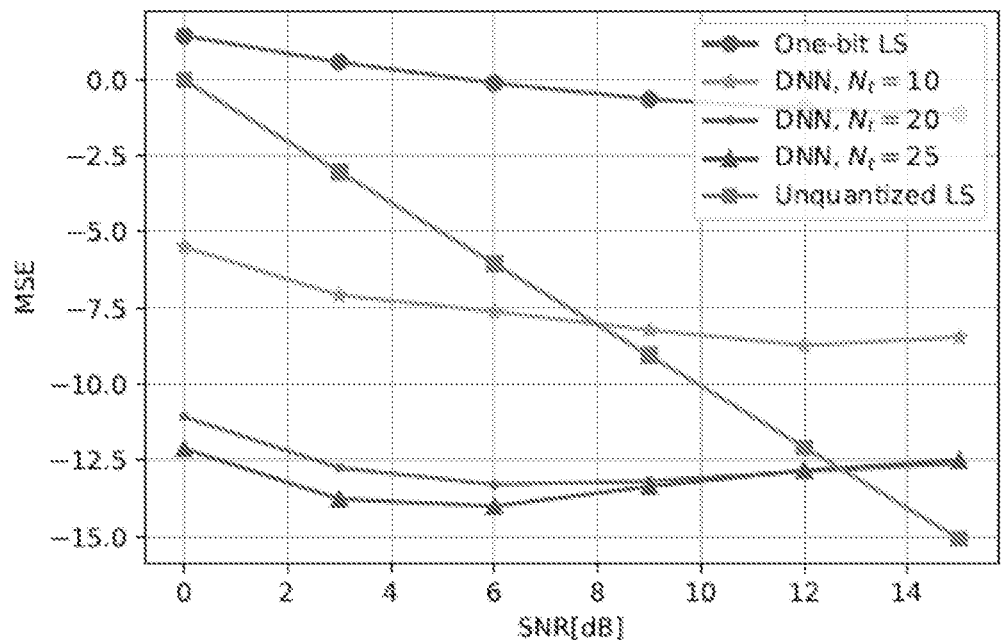
FIG. 10A is a plot of the mean square error (MSE) for 3 complex Gaussian channel taps according to various embodiments of the present technology.

The comparison for 3 complex Gaussian channel taps is provided in FIG. 10A in terms of MSE including the DNNs trained with 3 different number of pilots. Note that LS channel estimation can nearly give the same performance whether the number of pilots is 10, 20, or 25. Hence, its performance is only given for 25 pilots that are sent at the beginning of each coherence interval. As can be seen from this plot, the key parameter that determines the efficiency of the proposed model is the number of pilots. That is, doubling the number of pilots from 10 to 20 significantly enhances the performance. Further increase does not have much impact. Hence, it can be deduced that 20 pilots are reasonable to train an OFDM system that has 64 subcarriers. The most interesting observation related with FIG. 10A is that although the proposed DNN model have only seen one-bit quantized OFDM samples, it can beat the LS estimation that works with unquantized OFDM samples up to 12 dB SNR. Additionally, the DNN is always better than the LS channel estimation with one-bit ADCs over all SNRs.

Figure 10B:
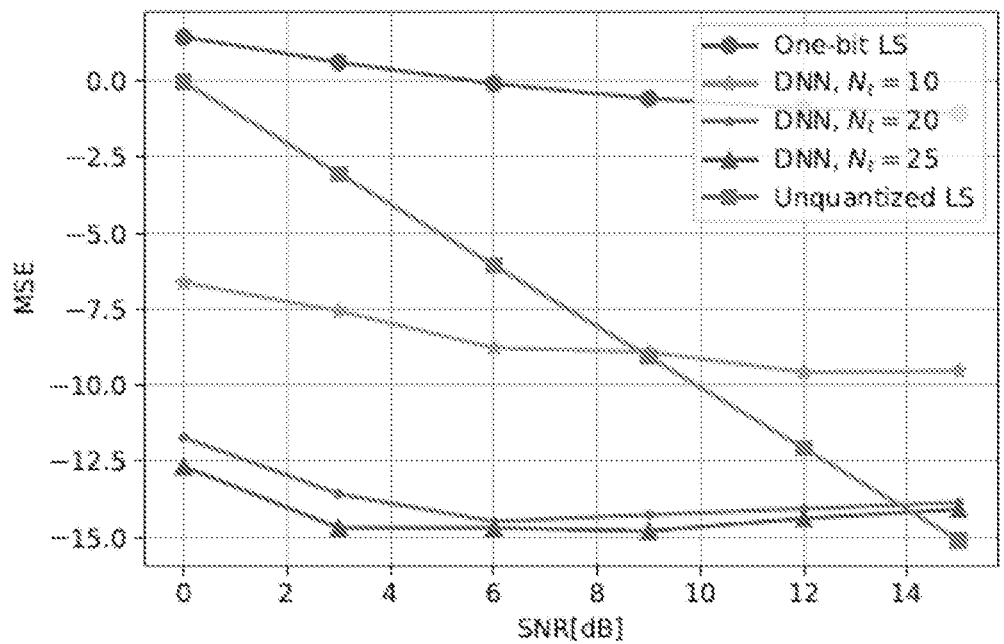
FIG. 10B is a plot of the MSE for 10 complex Gaussian channel taps according to some embodiments of the present technology.

To observe the impact of the number of channel taps to the aforementioned model, the number of channel taps has been increased to 10 while keeping all the parameters same. This case is depicted in FIG. 10B. It is worth emphasizing that an increase in the number of channel taps leads to a slight improvement in the performance of the proposed DNN. That is, various embodiments of the model are better than the LS channel estimation for unquantized OFDM samples up to 14 dB.

A natural question is the performance of the model when there are more subcarriers, such as 1024. One of our empirical observations is that increasing the number of subcarriers significantly increases the complexity, and thus simulation time. This makes sense, because as seen in Table I, the number of parameters increases quadratically with the number of subcarriers. By this is meant that it is not a reasonable approach to simply increase the dimension of the proposed model to estimate the channel for higher number of subcarriers. To address this issue, large OFDM blocks have to be divided into smaller subblocks, and processed with kernels. This can be seen as a type of convolution operation.

B. Data Detection

AE-OFDM architecture can be obtained by implementing the layers $I_1$-$I_8$ in FIG. 6 as tensors, whose parameters are trained through gradient descent with the Adam optimizer. The performance of the proposed AE-OFDM is compared with the conventional uncoded OFDM communication both for unquantized and one-bit quantized samples that employs subcarrier basis detection, i.e., detecting the symbols according to the minimum Euclidean distance criterion after applying a single tap equalization. In particular, a theoretical benchmark error rate was obtained for the ideal unquantized OFDM for Rayleigh fading channels to see the efficiency of the AE-OFDM. For data detection, it is considered that there are 48 data, 4 pilot and 12 guard subcarriers. The CP length is taken as 16 without loss of any generality. To observe the efficiency of learning in high dimensions, the error rate of the AE-OFDM is presented for different values of G, namely for 1, 2, 4.

Figure 11:
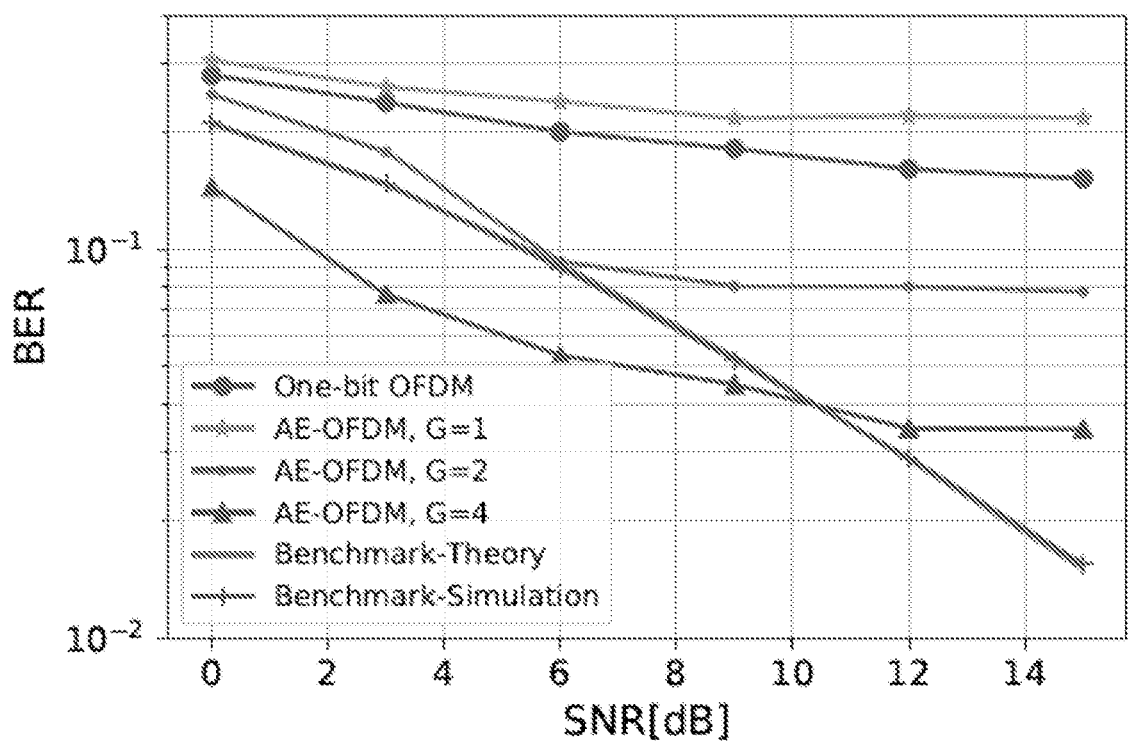
FIG. 11 is a plot of the average BER in fading when there are 64 subcarriers, each of which has been modulated with QPSK along with a benchmark presented both for the average theoretical BER of QPSK in Rayleigh fading and its simulation.

It may be expected that any deep learning based detection for one-bit ADCs can give an error performance in between the unquantized and one-bit quantized OFDM detection. However, this is not the case as demonstrated in FIG. 11. Specifically, AE-OFDM leads to a slight performance decrease with respect to the one-bit quantized OFDM for G=1. On the other hand, there is a performance boost if G is doubled such that some embodiments can achieve a BER that is competitive with unquantized OFDM up to 6 dB. More interestingly, AE-OFDM can beat the theoretical uncoded OFDM error rate in Rayleigh fading channels for G=4 up to 10 dB. This gain resembles the gains seen from channel coding, which consume bandwidth, unlike time domain oversampling. It appears that AE-OFDM is an appealing alternative receiver architecture for low-to-medium SNRs.

CONCLUSION

Replacing the high resolution ADCs with one-bit ADCs can enable a large decrease in receiver cost and power consumption, but leads to a significant performance loss in single antenna OFDM receivers in terms of both channel estimation and data detection if conventional methods are utilized. Various embodiments of the present technology provide for novel deep learning methods for OFDM systems for a moderate number of subcarriers. Some embodiments use a generative supervised DNN for channel estimation using generative modeling and multi-layer neural networks. Results reveal that reliable channel estimation can be achieved despite the nonlinear impairments of one-bit quantization. Additionally, some embodiments use an unsupervised autoencoder detection method for OFDM receivers equipped with one-bit ADCs. Various embodiments of this model can achieve a satisfactory error rate when the number of neurons in the hidden layers before the quantization layer is sufficiently increased. Promisingly, results demonstrate that unquantized OFDM performance can be beaten by deep learning methods.

Additional embodiments of the present technology can be generalized to more subcarriers. It is important to emphasize that processing the overall OFDM block with a fully connected neural layer is probably not a reasonable approach for N>>64, and so a modified architecture would be necessary.

Additionally, some embodiments can sue more than 1 transmit and/or receive antenna along with possible MIMO transceiver architectures.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A communication system receiver using low-resolution quantization to reduce power consumption, the communication system receiver comprising:
    a low resolution analog to digital convertor that produces a quantized complex valued received signal;
    a first neural network to assist in channel estimation, wherein the first neural network uses the quantized complex valued received signal as part of labeled data that trains the first neural network to learn a channel;
    a second neural network to enhance quality of a channel estimator which is made by the first neural network, wherein the second neural network is a special unsupervised untrained generative deep neural network; and
    a third neural network for data detection to decode transmitted data, wherein a detector is trained offline irrespective of a current channel estimate to be able to detect data symbols that were encoded by a neural network based precoder at a transmitter whose weights depend on the current channel estimate.

2. The communication system receiver of claim 1, wherein the low resolution analog to digital converter is a one-bit analog to digital converter.

3. The communication system receiver of claim 1, wherein the communication system receiver feeds back an output of the first neural network to the transmitter to be used in the neural network based precoder at the transmitter.

4. The communication system receiver of claim 1, wherein a decoder is trained without explicitly considering the channel and an orthogonal frequency-division multiplexing (OFDM) modulator.

5. The communication system receiver of claim 1, wherein the channel estimator is trained using labeled data produced via pilot symbols and corresponding one-bit quantized observations.

6. The communication system receiver of claim 1, wherein the precoder is learned after a decoder is trained while taking into account the channel and an orthogonal frequency-division multiplexing (OFDM) modulator.

7. The communication system receiver of claim 1, wherein:
    precoded symbols are multiplied with a learned precoder matrix; and
    the precoded symbols are normalized to ensure an average transmission power constraint.

8. The communication system receiver of claim 1, wherein the channel is a frequency selective fading channel with multiple subcarriers.

9. A neural network-based receiver using low-resolution quantization to reduce power consumption, the neural network-based receiver comprising:
- an antenna to receive a wireless signal from a transmitter using a number of subcarriers in a frequency selective fading channel;
- an analog to digital converter connected to the antenna to quantize the wireless signal;
- a deep learning-based channel estimator that utilizes an unsupervised untrained generative deep learning technique to improve channel estimation quality; and
- an autoencoder that learns a precoder and a decoder to detect transmitted data symbols.

10. The neural network-based receiver of claim 9, wherein parameters learned for the precoder are transmitted to a transceiver before transmission of the wireless signal.

11. The neural network-based receiver of claim 9, wherein the decoder is trained offline and irrespective of the frequency selective fading channel.

12. The neural network-based receiver of claim 9, wherein the precoder is trained online in conjunction with a trained decoder and while taking into account the frequency selective fading channel.

13. The neural network-based receiver of claim 9, wherein the analog to digital converter has a resolution of six bits or less per in-phase (I) and quadrature (Q) channel.

14. A method for operating a orthogonal frequency division-multiplexing communication system receiver, the method comprising:
- performing channel estimation using a first neural network and a second neural network,
- wherein the first neural network uses a set of pilot symbols as an input layer and identifies parameters for multiple hidden layers to produce an output,
- wherein the parameters are identified by minimizing an error between a function of the output and a labeled data set, and
- wherein the second neural network does not require training and combines a special untrained generative deep neural network with a least squares (LS) estimator; and
- performing data detection using a third neural network.

15. The method of claim 14, wherein the first neural network is trained using labeled data produced via pilot symbols and corresponding one-bit quantized observations.

16. The method of claim 14, wherein performing channel estimation includes performing channel estimation using a generative supervised deep neural network that was trained with a number of pilot symbols.

17. The method of claim 14, further comprising:
- generating a learned precoder by training a precoder after the channel estimation; and
- notifying a transmitter of the learned precoder before data transmission begins.

18. The method of claim 17, wherein the learned precoder is generated with stochastic computing-based hardware.

19. The method of claim 14, wherein the first neural network is a generative model that generates random inputs from a learned distribution.

20. The method of claim 14, wherein the first neural network and the third neural network are separately trained.

* * * * *